Dec. 23, 1969    M. J. BOZICH    3,485,472
VALVE MEANS HAVING COLLAPSIBLE ELASTIC SLEEVE
Filed April 26, 1965    2 Sheets-Sheet 1

INVENTOR.
MICHAEL J. BOZICH
BY
ATTORNEY

United States Patent Office 3,485,472
Patented Dec. 23, 1969

3,485,472
**VALVE MEANS HAVING COLLAPSIBLE
ELASTIC SLEEVE**
Michael J. Bozich, 1059 Bayridge Ave.,
Pittsburgh, Pa. 15226
Filed Apr. 26, 1965, Ser. No. 450,886
Int. Cl. F16l 55/14, 21/02
U.S. Cl. 251—5                              3 Claims

ABSTRACT OF THE DISCLOSURE

Improvements in valves of the type having a collapsible elastic sleeve for varying the flow of materials through the valve. The improvements comprise a simplified construction whereby the valve may be installed directly onto the bare conduit ends without the need for providing the conduit ends with flanges or other similar connecting devices. These improvements result in a considerable reduction in both the costs of manufacture and use of this type of valve, as well as ease and simplicity of use of the valve.

---

This invention relates to improvements in valves of the type having a collapsible elastic sleeve for varying the flow of materials through the valve, and more particularly to valves of the type described for use in connecting the spaced apart ends of two coaxial conduits.

As an overall object, the present invention seeks to provide an improved valve of the type described.

Another object of the invention is to provide a valve of the type described which is of simple construction yet retains substantially all of the advantages found in prior-art valves of the same type.

Still another object of the invention is to provide a valve of the type described which may be installed directly on the bare conduit ends thereby eliminating the need for providing the conduit ends with flanges or like connecting components.

A further object of the invention is to provide a valve of the type described which comprises a unitary structure and which may be secured to the conduit ends by connecting means forming part of the structure rather than employing extrinsic fastening elements.

A still further object of the invention is to provide a valve of the type described which is considerably less expensive to manufacture than similar valves of the prior art.

In accordance with the present invention, a valve is provided which is adapted to connect the opposed, spaced-apart ends of two coaxial conduits. The valve comprises an outer cylindrical member which surrounds an elongated elastic sleeve spanning the distance between the spaced conduit ends and overlaps the same. Means engageable with each end of the cylindrical member is provided for sealing the space between the sleeve and the conduits and between the sleeve and the cylindrical member. Means is provided for collapsing the central portion of the sleeve into the space between the opposed conduit ends thereby regulating the flow of materials between the coaxial conduits. The means for collapsing the sleeve preferably comprises a working fluid, such as, compressed air, water, oil and the like, compressed air being preferred. However, it is within the scope of the appendant claims that a suitable mechanical means may be provided for pinching the sleeve in the appropriate region instead of the working fluid.

The above and other objects and advantages of the present invention will become apparent from the following detailed description by reference to the accompanying drawings, in which.

Figure 1:
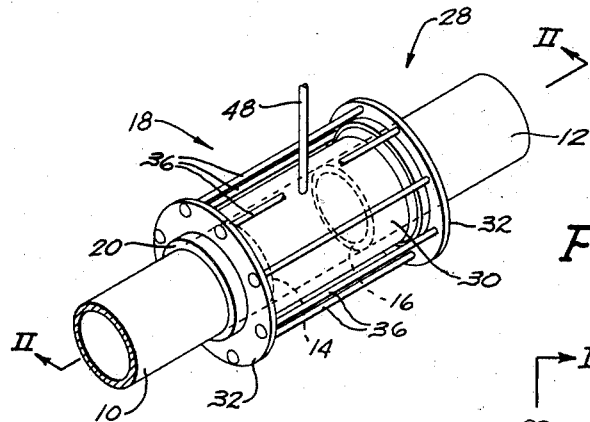
FIG. 1 is a fragmentary isometric view illustrating the present valve installed between two spaced conduits.

Referring now to FIG. 1, there is illustrated a pair of coaxial conduits 10, 12 having spaced-apart, opposed conduit ends 14, 16, respectively, shown in phantom outline. A valve 18 of the invention, connects the conduit ends 14, 16 and serves to regulate the flow of materials between the conduits 10, 12. The valve 18 is suitable for regulating the flow of gases, liquids, slurries, granular materials and the like.

In FIG. 1, the valve 18 is shown installed at an intermediate location in the conveying conduit represented by the coaxial conduits 10, 12. It will be appreciated, however, that the valve 18 could function as a discharge valve for discharging materials into, for example, an open trough, bins or other containers. In this instance, one of the conduits 10, 12 would terminate a short distance from the valve 18 and be positioned to discharge the material in the container.

Figure 2:
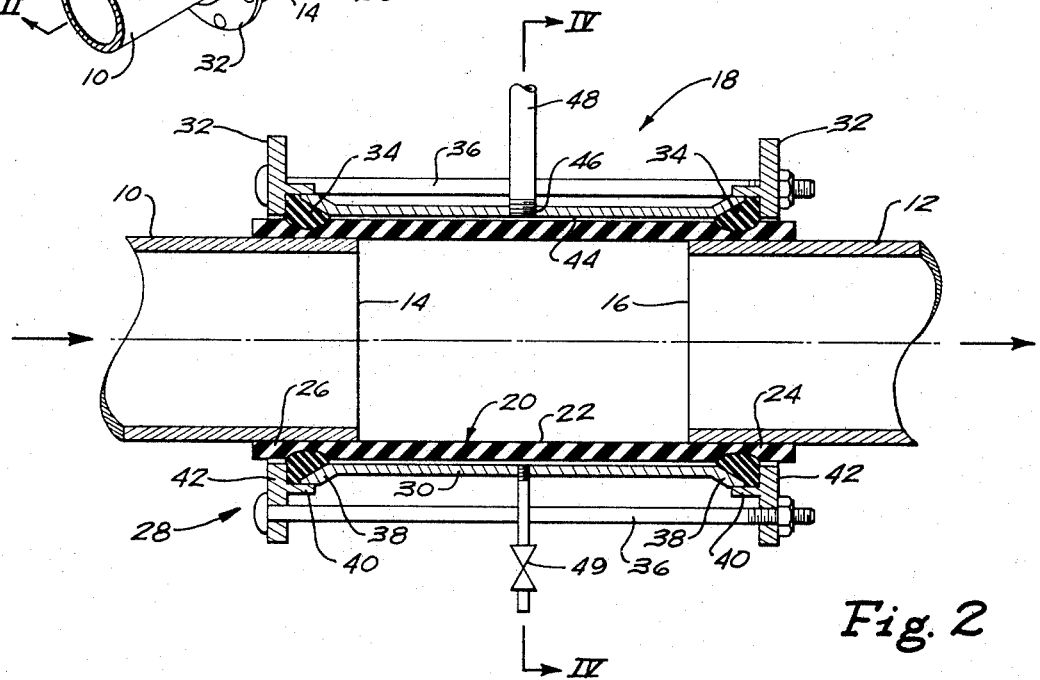
FIG. 2 is a cross-sectional view, taken along the line II—II of FIG. 1, illustrating the internal construction of the present valve means.

Referring now to FIG. 2, the valve 18 is shown comprising an elongated elastic sleeve 20 having a central portion 22 spanning the distance between the conduit ends 14, 16 and end portions 24, 26 fitted over the conduit ends 14, 16. For certain application of the valve 18, the sleeve 20 may be formed from pure gum rubber. For other applications of the valve 18 wherein the conditions warrant, the sleeve 20 may be formed from synthetic rubbers such as neoprene and the like. As will be described, the sleeve 20 is partially or completely collapsed in the space between the conduit ends 14, 16 to regulate the flow of materials between the conduits 10, 12. Therefore, the elastic material from which the sleeve 20 is formed, must be flexible enough so as to permit complete collapse, that is, complete closing of the valve 18.

Surrounding the sleeve 20 is a coupling 28 which serves two main functions. Firstly, the coupling 28 provides a means for effecting a seal between the sleeve 20 and the conduits 10, 12; and, secondly, the coupling 28 cooperates with the sleeve 20 to define a chamber (to be described) into which an operating fluid is admitted for collapsing the sleeve 20.

In this embodiment, the coupling 28 comprises a cylindrical member 30 having a follower member 32 at each end, a resilient ring gasket 34 interposed between each end of the cylindrical member 30 and the follower members 32, and a plurality of fasteners 36 extending between and through the follower members 32. The overall arrangement of the coupling 28 is such that when the fasteners 36 are tightened, the follower members 32 will be displaced toward each other to compress the ring gaskets 34 between the ends of the cylindrical member 30 and the follower members 32 while simultaneously pressing radially inwardly on the end portions 24 of the sleeve 20 to form a seal between the sleeve 20 and the conduits 10, 12.

Figure 3:
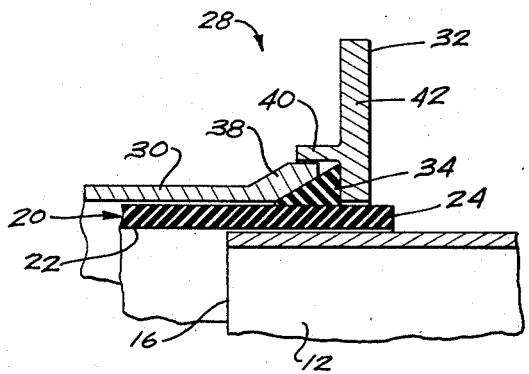
FIG. 3 is a fragmentary cross-sectional view of one end of the present valve means illustrating certain size relationships.

In FIG. 3, one end of the coupling 28 is illustrated in an unclamped condition, that is, prior to tightening the fasteners 36. As can be seen, the cylindrical member 30 has outwardly flared ends 38 which cooperate with the end portions 24 of the sleeve 20 to provide a pocket into which the resilient ring gasket 34 is received. The resilient ring gasket 34 is preferably wedge-shaped as shown. The follower member 32 is provided with a cylindrical flange 40 which projects perpendicularly from an annular plate portion 42 and over the outwardly flared end 38 of the cylindrical member 30. The annular plate portion 42 extends radially inwardly of the cylindrical flange 40 and cooperates with the outwardly flared end 38 to compress the resilient ring gasket 34. The annular plate portion 42 also extends radially outwardly of the cylindrical flange 40 to provide a region through which the fasteners 36 will extend.

As can best be seen in FIG. 3, the inside diameter of the sleeve 20 may be slightly greater than the outer diameter of conduits 10, 12 so that the sleeve 20 may be easily fitted over the conduits 10, 12 during the installation of the valve means 18. The inner diameter of the sleeve 20 may, however, be substantially equal to or slightly less than the outer diameter of the conduits 10, 12. In this instance, a suitable lubricant is applied to the inner surface of the sleeve 20 to facilitate fitting the sleeve 20 over the ends 14, 16. It should also be noted that the ring gaskets 34 are engaged with the outer surface of the sleeve 20 and thereby prevents the sleeve 20 from sliding axially out of the valve 18. Therefore, the valve 18 is, in effect, a unitary structure.

Referring again to FIG. 2, when the follower members 32 are pulled together by the fasteners 36, the resilient ring gaskets 34 will be compressed. Under compression, the inner face of the ring gaskets 34 will be displaced radially inwardly into engagement with the end portions 24 of the sleeve 20, and compress the same against the outer walls of the conduits 10, 12. In this manner, the space between the sleeve 20 and the conduits 10, 12 is sealed. It should also be noted in FIG. 2 that the spaces between the ends of the cylindrical member 30 and the sleeve 20 are also sealed and, therefore, an annular chamber 44 is provided, defined by the inner surface of the cylindrical member 30, the outer surface of the sleeve 20 and the sealed ends thereof.

The cylindrical member 30 is provided with an opening 46 which communicates with the annular chamber 44. In this instance, the opening 46 is threaded and receives threadedly engaged therein a supply conduit 48 serving to introduce and withdraw a working fluid, such as pressurized air, from the annular chamber 44. Although not specifically illustrated herein, the supply conduit 48 will have associated therewith suitable control means for varying the pressure of the working fluid admitted into the annular chamber 44. Hence, the amount of collapse of the sleeve 20 is controlled so as to effect changes in the rate of flow of materials between the conduits 10, 12. The cylindrical member 30 preferably is provided with a relief valve 49 which serves to exhaust the pressurized air to the atmosphere in the event too great a presure is applied to the sleeve 20. Therefore, blowout of the sleeve 20 is prevented.

Figure 4:
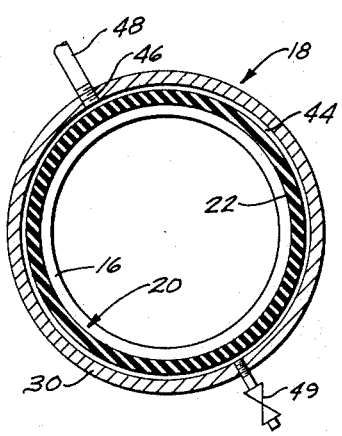
FIG. 4 is a cross-sectional view, taken substantially along the line IV—IV of FIG. 2, illustrating the present valve means in a fully open condition.
Figure 5:
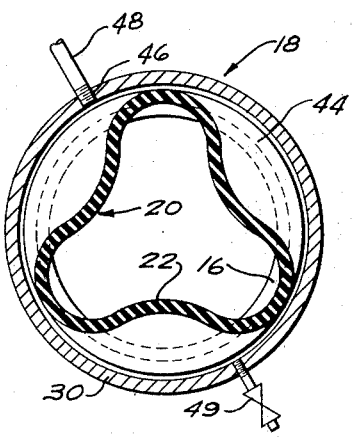
FIG. 5 is a cross-sectional view, similar to FIG. 4, illustrating the present valve in a partially closed condition.
Figure 6:
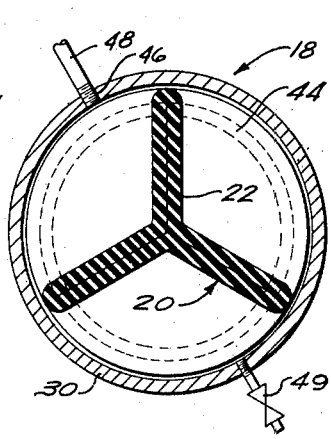
FIG. 6 is a cross-sectional view, similar to FIG. 4, illustrating the present valve means in a completely closed condition.

To illustrate the operation of the present valve 18, reference is directed to FIGS. 4, 5 and 6. In FIG. 4, the central portion 22 of the sleeve 20 is shown in its normal expanded condition whereby materials are permitted to flow between the conduits 10, 12 at a maximum rate. In FIG. 5, however, pressurized air admitted into the chamber 44 has caused the central portion 22 of the sleeve 20 to be partially collapsed. Since the central portion 22 of the sleeve 20 has been partially collapsed, the cross-sectional flow area has been correspondingly reduced to effect decrease in the rate of flow of materials between the conduits 10, 12. In FIG. 6, pressurized air has been admitted into the chamber 40 at a pressure level which is sufficient to cause complete collapse of the central portion 22 thereby substantially entirely restricting the flow of materials between the conduits 10, 12.

Hence, in FIG. 4 the sleeve 20 is illustrated in a first extreme position wherein the central portion 22 is in its normal expanded condition permitting maximum flow through the valve 18. In FIG. 6, the sleeve 20 is illustrated in a second extreme position wherein the central portion 22 has undergone complete collapse sealing off communication between the conduits 10, 12. It should be evident, that the amount of collapse in the sleeve 20 is proportional to the pressure level of the working fluid within the chamber 44. Consequently, the present valve 18 may be operated to vary the rate of flow of materials over a wide range of flow rates. Alternatively, the valve 18 may be operated as a pinch valve having two positions, that is, the ON position illustrated in FIG. 4 and the OFF position illustrated in FIG. 6. When operated as a pinch valve, the valve 18 may be quickly opened and quickly closed since, the pressure level of the working fluid within the chamber 44 may be quickly lowered or elevated as desired.

Figure 7:
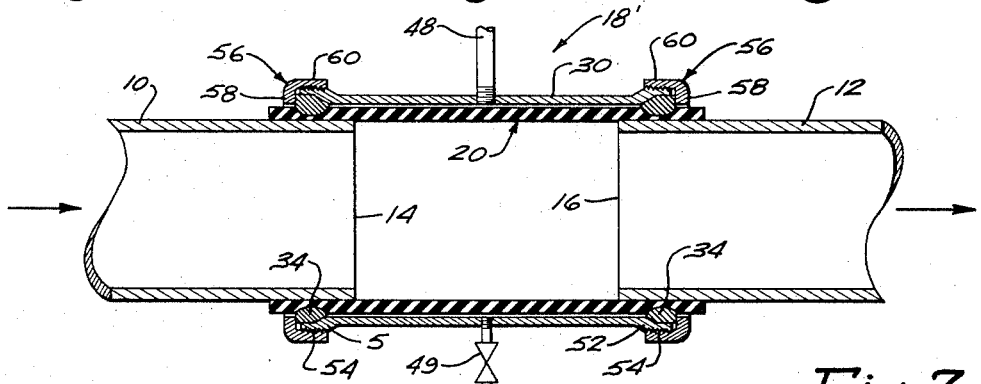
FIG. 7 is a cross-sectional view, similar to FIG. 2, illustrating an alternative embodiment of the present valve means.
Figure 8:
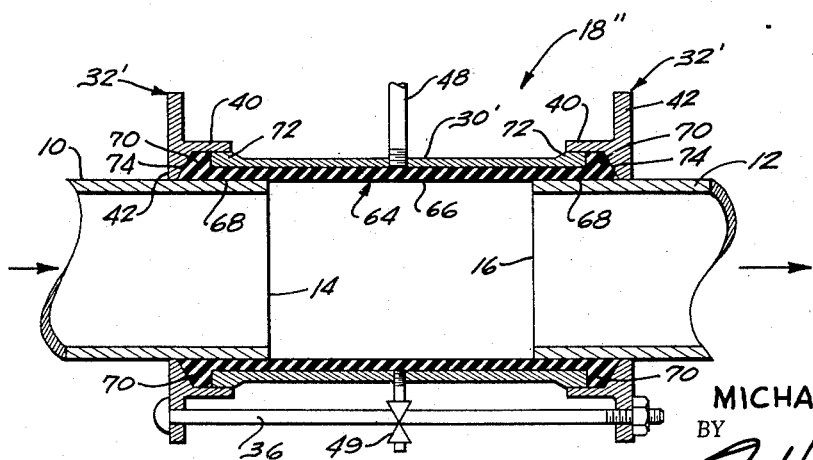
FIG. 8 is a cross-sectional view, similar to FIG. 2, illustrating a further alternative embodiment of the present valve means.

Alternative embodiments of the present valve are illustrated in FIGS. 7 and 8. Corresponding numerals will be employed to identify corresponding parts heretofore described.

In FIG. 7, a valve 18' is illustrated wherein the cylindrical member 30 is provided with outwardly flared ends 52 having external threads 54 formed thereon. The resilient ring gaskets 34 are received within the outwardly flared ends 52. The valve 18' is provided with a compression cap member 56 having an inwardly extending annular wall of flange 58 engaged with the ring gasket 34 and a cylindrical portion 60 having internal threads engageable with the external threads 54 of the outwardly flared ends 52. In this embodiment, each of the ring gaskets 34 may be individually compressed to provide the seals between the sleeve 20 and the conduits 10, 12 and between the sleeve 20 and the cylindrical member 30. For example, the valve 18' may be first slid over the conduit end 14 of the conduit 10 and secured thereto by tightening of the appropriate compression cap member 56. Thereafter, the conduit 12 may be inserted into the other end of the sleeve 20 whereupon the compression cap member 56 adjacent thereto may be tightened. After installation, the valve 18' is operated in the same manner as the valve 18 of FIG. 2.

In FIG. 8, there is illustrated a valve 18" having a cylindrical member 30', follower members 32' and the fasteners 36. In this embodiment, an elongated elastic sleeve 64 is provided which has a central portion 66 spanning the distance between the conduit ends 14, 16 of the conduits 10, 12 and end portions 68 fitted over the conduit ends 14, 16. Each of the end portions 68 is provided with a radial flange 70 preferably formed integrally with the end portions 68.

The cylindrical member 30' is provided with end portions 72 which are thicker than the remaining wall of the cylindrical member 30' and are engaged with the radial flanges 70 of the elastic sleeve 64. Each of the follower members 32' has an inner, inclined wall 74 provided on the inner portion of the annular plate 42. The inclined wall 74 cooperates with the end portions 72 of the cylindrical member 30' to compress the radial flange 70 when the fasteners 36 are tightened. It should be noted, however, that the annular surfaces of the end portions 72 are perpendicular to the central axis of the valve 18". Furthermore, the inner wall 74 of the follower member 32 is inclined from the point of intersetion with the cylindrical flange 40 outwardly away from the end portions 72. The overall arrangement of the end portion 72 and the inner inclined wall 74 is such that when the fasteners 36 are tightened, the flange 70 will be compressed between the end portions 72 and the inner inclined wall 74 and force the end portion 68 of the elastic sleeve 64 into sealing engagement with the conduits 10, 12. It should also be noted that the overall arrangement of the end portions 72 and the inner inclined wall 74 is such that the radial flange 70 of the sleeve 64 may be compressed without affecting the central portion 66 of the sleeve 64. The valve 18'' will be operated in exactly the same manner as the valve 18 of FIG. 2.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In combination, two coaxial conduits having opposed, spaced-apart ends, the outer surfaces of said spaced-apart ends being of uniform diameter and of the same diameter as the major portions of the conduits, a collapsible valve connecting said spaced-apart ends, said valve comprising an elongated elastic sleeve spanning the distance between said opposed ends and overlying said opposed ends, circumferential flange means comprising separate ring gaskets of elastic material surrounding the portions of the sleeve which overlie said opposed ends, an integral rigid cylindrical member surrounding said sleeve and having outwardly-flared opposite ends engaged with said circumferential flange means, said circumferential flange means of elastic material being disposed between said outwardly-flared ends of the outer periphery of said sleeve, means including said outwardly-flared opposite ends for compressing said circumferential flange means by forces at least some of which are transverse to the axis of said conduits whereby the spaces between said sleeve and said conduits and between said sleeve and said outwardly-flared opposite ends are sealed with the inner periphery of said sleeve being forced into snug abutting and sealing relationship with said spaced-apart ends by said transverse forces, and means for introducing a fluid into said cylindrical member for collapsing said sleeve in the space between said opposed ends to thereby vary the rate of flow of materials between said coaxial conduits.

2. The combination of claim 1 wherein said compressing means comprises two annular followers each of which is engaged with an associated one of said circumferential flange means of elastic material, and tie means extending between the annular followers for displacing said annular followers toward each other to thereby compress said circumferential flange means of elastic material simultaneously.

3. The combination of claim 1 wherein said compressing means comprises a cylindrical cap member having an inwardly extending flange on one end engageable with said circumferential elastic flange means and internal threads on opposite ends engageable with external threads provided on the ends of said cylindrical member.

References Cited

UNITED STATES PATENTS

| 2,148,036 | 2/1939 | Pfefferle | 285—53 |
| 3,368,831 | 2/1968 | Phillipps | 285—382.7 |

WILLIAM F. O'DEA, Primary Examiner

RICHARD GERARD, Assistant Examiner

U.S. Cl. X.R.

285—369